United States Patent
Asnis et al.

(10) Patent No.: US 9,628,849 B2
(45) Date of Patent: Apr. 18, 2017

(54) AGGREGATED CONTROL AND PRESENTATION OF MEDIA CONTENT FROM MULTIPLE SOURCES

(71) Applicant: SLING MEDIA INC., Foster City, CA (US)

(72) Inventors: Ilya Asnis, San Jose, CA (US); Nino Marino, Alameda, CA (US)

(73) Assignee: Sling Media, Inc., Foster City, CA (US)

( * ) Notice: Subject to any disclaimer, the term of this patent is extended or adjusted under 35 U.S.C. 154(b) by 358 days.

(21) Appl. No.: 14/054,585

(22) Filed: Oct. 15, 2013

(65) Prior Publication Data
US 2014/0109144 A1 Apr. 17, 2014

Related U.S. Application Data

(60) Provisional application No. 61/713,049, filed on Oct. 12, 2012.

(51) Int. Cl.
| | |
|---|---|
| *H04N 7/173* | (2011.01) |
| *H04N 21/436* | (2011.01) |
| *H04N 21/41* | (2011.01) |
| *H04N 21/4147* | (2011.01) |
| *H04N 21/4227* | (2011.01) |

(Continued)

(52) U.S. Cl.
CPC ... *H04N 21/43615* (2013.01); *H04N 21/4122* (2013.01); *H04N 21/4147* (2013.01); *H04N 21/4227* (2013.01); *H04N 21/4622* (2013.01); *H04N 21/482* (2013.01); *H04N 21/632* (2013.01)

(58) Field of Classification Search
None
See application file for complete search history.

(56) References Cited

U.S. PATENT DOCUMENTS

| | | | |
|---|---|---|---|
| 6,097,441 | A | 8/2000 | Allport |
| 6,263,503 | B1 | 7/2001 | Margulis |

(Continued)

FOREIGN PATENT DOCUMENTS

| | | |
|---|---|---|
| WO | 0072596 A1 | 11/2000 |
| WO | 2010027784 A2 | 3/2010 |
| WO | 2012070064 A1 | 5/2012 |

OTHER PUBLICATIONS

European Patent Office, Extended European Search Report for European Patent No. 13 188 589.9-1905 mailed Dec. 5, 2014.

(Continued)

*Primary Examiner* — Mushfikh Alam
(74) *Attorney, Agent, or Firm* — LK Global

(57) ABSTRACT

Systems and methods are described for aggregating media content from multiple sources for viewing on a local display or for placeshifting to a remote display. The aggregation system responds to instructions received from a remote device via the digital network to provide the video output incorporating the media content received from any of the media sources to the locally-connected display. The media aggregation system also simultaneously provides a place-shifted video stream to the remote device via the digital network that incorporates media content received from any of the plurality of media sources selected in response to the instructions received from the remote device.

12 Claims, 6 Drawing Sheets

(51) Int. Cl.
*H04N 21/462* (2011.01)
*H04N 21/63* (2011.01)
*H04N 21/482* (2011.01)

(56) References Cited

U.S. PATENT DOCUMENTS

| | | | |
|---|---|---|---|
| 6,493,874 B2 | 12/2002 | Humpleman | |
| 6,519,011 B1* | 2/2003 | Shendar | H04N 5/4401 348/731 |
| 7,861,272 B2* | 12/2010 | Russ | H04L 29/06027 725/131 |
| 7,877,776 B2 | 1/2011 | Krikorian et al. | |
| 7,962,937 B2* | 6/2011 | Cho | H04N 7/17318 725/37 |
| 8,266,657 B2 | 9/2012 | Margulis | |
| 8,667,163 B2 | 3/2014 | Krikorian et al. | |
| 2003/0005455 A1* | 1/2003 | Bowers | H04N 7/17336 725/90 |
| 2003/0163829 A1* | 8/2003 | Coufal | H04N 7/16 725/118 |
| 2004/0049791 A1 | 3/2004 | Shah et al. | |
| 2007/0124761 A1 | 5/2007 | Chen et al. | |
| 2007/0162936 A1 | 7/2007 | Stallings et al. | |
| 2007/0162945 A1* | 7/2007 | Mills | H04N 7/17318 725/119 |
| 2008/0010380 A1* | 1/2008 | Whitehead | H04N 21/2408 709/227 |
| 2008/0056675 A1 | 3/2008 | Wright et al. | |
| 2008/0307463 A1 | 12/2008 | Beetcher et al. | |
| 2009/0083789 A1* | 3/2009 | Quinney | G09G 5/003 725/38 |
| 2009/0241151 A1 | 9/2009 | Frank et al. | |
| 2010/0064351 A1 | 3/2010 | Johansson et al. | |
| 2010/0070925 A1 | 3/2010 | Einaudi et al. | |
| 2010/0146527 A1* | 6/2010 | Craib | H04N 7/17318 725/5 |
| 2010/0205628 A1 | 8/2010 | Davis et al. | |
| 2010/0268832 A1 | 10/2010 | Lucas et al. | |
| 2011/0055864 A1 | 3/2011 | Shah et al. | |
| 2011/0126225 A1* | 5/2011 | Turgeman | H04N 21/222 725/31 |
| 2011/0153845 A1 | 6/2011 | Rao et al. | |
| 2011/0196521 A1 | 8/2011 | Jain et al. | |
| 2012/0047532 A1 | 2/2012 | McCarthy, III | |
| 2012/0116934 A1 | 5/2012 | Chittella | |
| 2012/0131627 A1 | 5/2012 | Chittella | |
| 2012/0192227 A1* | 7/2012 | Fleischman | H04N 21/2407 725/34 |
| 2012/0216236 A1* | 8/2012 | Robinson | H04N 7/16 725/118 |
| 2012/0326835 A1 | 12/2012 | Cockrell et al. | |

OTHER PUBLICATIONS

European Patent Office, Communication pursuant to Article 94(3) EPC for Application No. 13 188 589.9-1905 mailed Aug. 24, 2016.

* cited by examiner

AGGREGATED CONTROL AND PRESENTATION OF MEDIA CONTENT FROM MULTIPLE SOURCES

PRIORITY CLAIM

This application claims priority to U.S. Provisional Application Ser. No. 61/713,049, which was filed on Oct. 12, 2012.

TECHNICAL FIELD

The following discussion generally relates to systems and techniques for processing media content such as television programming and movies within a home entertainment system. More particularly, the following discussion relates to systems and methods to aggregate the control and presentation of media content received from different sources in a home entertainment system.

BACKGROUND

Customers continue to demand increasing flexibility and control of their media viewing experiences. Whereas television viewing traditionally involved sitting in front of a television set during a live broadcast of a program being viewed, modern television viewers now expect the ability to control the time as well as the location of their media viewing experience. To that end, numerous devices such as digital video recorders, placeshifting devices, and any number of media streaming systems have been developed with widespread consumer adoption and approval. Many television viewers now have home entertainment systems that incorporate many different audio/video components such as set top boxes, media players, audio/video receivers, digital video recorders and the like. Currently, each of these different devices is typically plugged into a different port of a conventional television set in the viewer's home.

As the home entertainment system incorporates more and more features and components, however, the complexity of the system can create several issues. Simply obtaining a desired program from any one component may involve separately controlling the television, an integrated video receiver, a program source, and/or any number of other devices. If the selected content is to be placeshifted to a mobile phone or other remote device, controlling the system becomes even more complicated and difficult.

Various attempts at video integration have been attempted, but all have met with limited success. So-called "universal remote controls", for example, have had difficulty in practice controlling multiple components of a home entertainment system, particularly as components evolve away from traditional infrared controls. Other types of integrated video switching devices have been attempted with various levels of success.

It nevertheless remains desirable to improve the aggregation and control of the wide variety of media content that is available from a consumer's home entertainment system. These and other desirable features and characteristics will become apparent from the subsequent detailed description and the appended claims, taken in conjunction with the accompanying drawings and this background section.

BRIEF SUMMARY OF EXAMPLE EMBODIMENTS

Many different systems, devices and methods are described for aggregating media content from multiple sources for viewing on a local display or for placeshifting to a remote display. In many of these examples, the various components of a home entertainment system are plugged into or otherwise coupled to an aggregator device. The aggregator is able to respond to user commands provided via a mobile phone, tablet, remote control or other remote device to control any of the various media sources or other components and to provide desired content on a television or other local display. The aggregator may also be able to simultaneously provide one or more placeshifted media streams for remote viewing. Various features and enhancements may additionally or alternately provided to any number of practical embodiments, as described more fully herein.

In a first example embodiment, a media aggregation system simultaneously provides media content received from any of a plurality of media sources to a television or other local display while also providing a separate placeshifted media stream to a remote device. The system suitably comprises a network interface configured to couple to and facilitate communication with a digital network; a display interface configured to provide a video output to a locally-connected display; a plurality of media interfaces, each media interface configured to couple the media aggregation system to receive media content from one of the plurality of media sources; and a controller. The controller is configured to respond to instructions received from a remote device via the digital network to simultaneously provide a placeshifted video stream to the remote device via the digital network while the system is providing video output incorporating media content from a first one of the plurality of media sources to the locally-connected display, wherein the video output incorporates the media content received from a first one of the plurality of media sources and the placeshifted video stream incorporates media content received from a second one of the plurality of media sources.

In another example embodiment, a method executable by a media aggregation system or other computing device suitably comprises receiving media content from each of a plurality of media sources by the media aggregation system; receiving control instructions from a remote device at the media aggregation system via a digital network; simultaneously switching media content from a first one of the plurality of media sources to an encoder and media content from a second one of the plurality of media sources to a decoder in response to the control instructions; providing decoded media content from the first media source to a display interface for output to a locally-connected display; and simultaneously transmitting encoded media content from the second media source as a placeshifted media stream to the remote device via the digital network.

Other examples provide remote devices, programs executable by remote devices, and/or methods executable by a remote device to control a remotely-located content aggregation system that is coupled to a plurality of content sources, each source having an associated remote control. One such method comprises receiving, at the remote device, a first user input that selects one of the plurality of content sources that are coupled to the remotely-located content aggregation system; in response to the first user input, the remote device generating a user interface for presentation on the display of the remote device, wherein the user interface comprises a graphical depiction of the remote control associated with the selected one of the plurality of content sources that are coupled to the remotely-located content aggregation system; in response to receiving a second user input at the remote device that identifies media content available from one of the plurality of content sources, transmitting a control instruction from the remote device to the remotely-located content aggregation system via a network, wherein the control instruction directs the remotely-located content aggregation system to obtain the identified media content from the selected content source; receiving a first placeshifted media stream from the remotely-located content aggregation system at the remote device, wherein the first placeshifted media stream is encoded by the remotely-located content aggregation system to include the identified media content; and presenting the first placeshifted media stream to the user via the display associated with the remote device. Other methods may include different features, additional features, or other modifications as desired.

Many other embodiments could provide additional, alternate or equivalent features. The examples provided here are described in increasing detail below, along with additional examples, embodiments and other features.

BRIEF DESCRIPTION OF THE DRAWING FIGURES

Exemplary embodiments will hereinafter be described in conjunction with the following drawing figures, wherein like numerals denote like elements, and FIG. 1 is a block diagram of an exemplary system for aggregating and controlling media content obtained from multiple sources in a home entertainment system.

DETAILED DESCRIPTION

The following detailed description of the invention is merely exemplary in nature and is not intended to limit the invention or the application and uses of the invention. Furthermore, there is no intention to be bound by any theory presented in the preceding background or the following detailed description.

Various embodiments provide a media aggregator device that accepts video output signals from multiple content sources operating within the customer's home entertainment system and that can be controlled from a phone, tablet, computer or other network-enabled device. The aggregator provides content from any of the various sources to a local display that is attached to the aggregator device, and/or to one or more other display devices that are accessible via the Internet or another network. The aggregator device is able to control each of the content-providing components in response to user commands received from the network-enabled device. The aggregator therefore provides a single point of control for all of the components operating within a home entertainment system.

Various additional benefits may also be available. Exemplary aggregator devices could facilitate multiple placeshifted streams, for example, that could be used to implement a picture-in-picture (PIP) or look-ahead function, or for any other purpose. The media player could be further customized to allow images of the different remote controls typically associated with the various components of the home entertainment system so that the user is presented with a familiar control interface. Additional or alternate features may be found in any number of equivalent embodiments.

Figure 1:
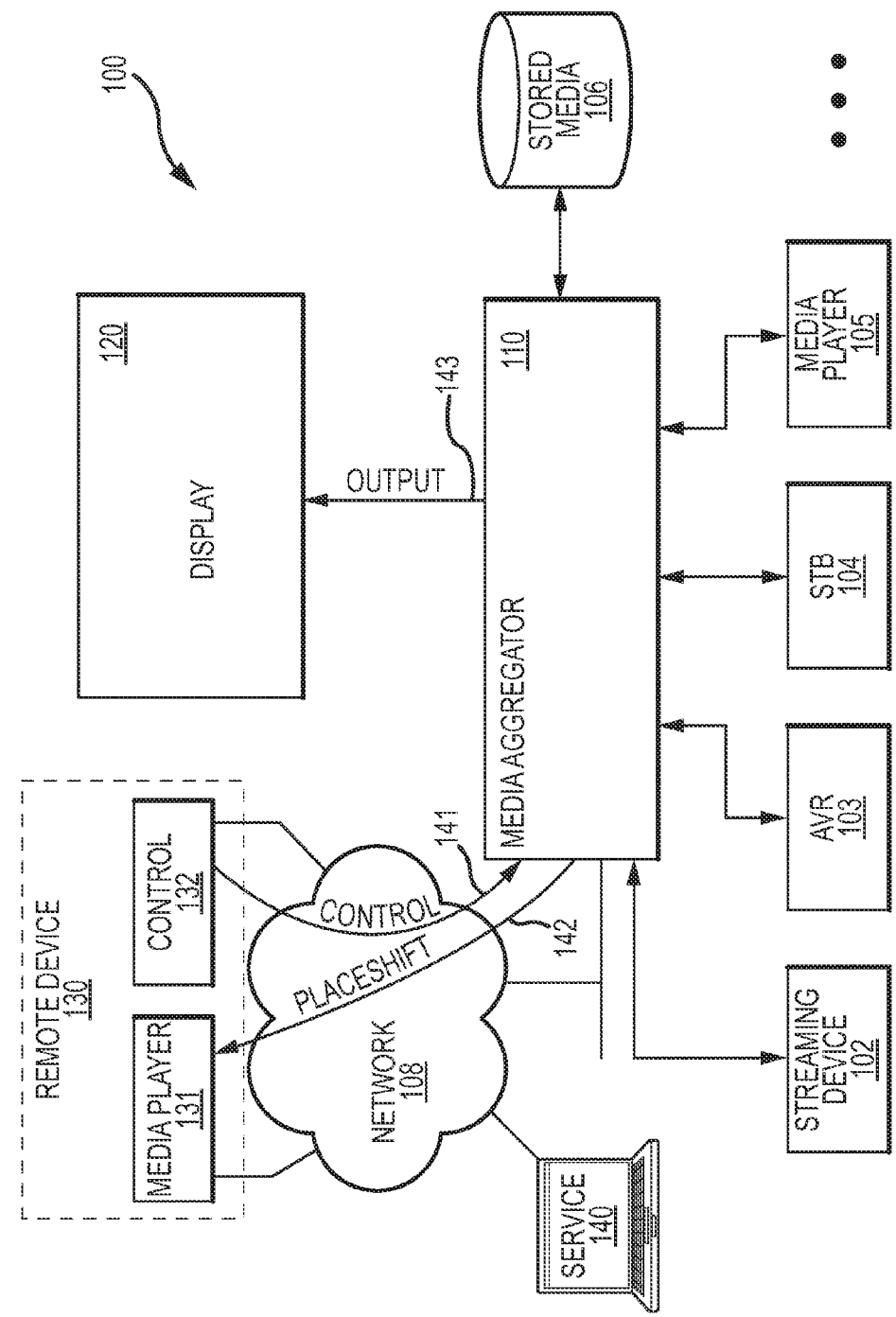

Turning now to the drawing figures and with initial reference to FIG. 1, an exemplary home entertainment system 100 suitably includes a media aggregator device 110 that receives audio/video media content from any number of media sources 102-106 and that renders content for presentation on a local display 120 and/or on a remote device 130. Aggregator 110 suitably receives commands 141 from a remote device 130 that are processed and relayed as appropriate to control any of the sources 102-106 and to route content from any of the sources 102-106 toward either local display 120 and/or remote device 130 as desired. In at least some embodiments, the aggregator 110 may additionally include a local user input device (such as front panels buttons, touch screen or the like) or a local hand held device that allow a user to control the output of content from the aggregator to the local display 120. Unlike conventional placeshifting devices that simply shifted content from a single source toward a remote client, the aggregator device 110 is able to obtain and process content from any number of different sources 102-106, as set forth in more detail below.

The exemplary embodiment illustrated in FIG. 1 shows five different sources 102-106 of media content, although other embodiments may provide additional or different content sources as desired. Examples of media content sources could include, without limitation, streaming devices (e.g., Apple TV, Google TV, HULU or NetFlix players, and/or the like) 102, audio/video receivers (AVRs) 103, set top boxes (STBs) or other television receivers 104, media players (e.g., DVD, Blu-Ray or the like) 105, digital video recorders (DVRs), video game consoles, and/or other devices as desired. Typically these media source devices are physical components that are physically and electrically connected to the aggregator device 110 in the user's home using cables or the like. Exemplary interfaces for connecting component media sources 102-105 could include component video, composite video, S-video, high definition multimedia interface (HDMI), and/or the like, as well as any number of other media interfaces presently known or subsequently developed. Equivalent embodiments may access network-enabled media sources 102-105 via network 108, via a hardwired or wireless local area network (LAN), or in any other manner.

Each of the various media sources 102-105 may be accessed and controlled in a manner that is appropriate to the particular component. Some source components 102-105 may be controlled using their native remote control commands provided by an infrared (IR) blaster device, a radio frequency (RF) transceiver and/or the like associated with media aggregator 110. Other components 102-105 may be controlled using consumer electronics control (CEC) or similar instructions associated with HDMI or similar protocols. Still other components may be controlled using wired or wireless networking protocols such as ETHERNET (IEEE 802.3), Wi-Fi (IEEE 802.11), Bluetooth (IEEE 802.15), ZIGBEE (IEEE 802.15.4) and/or the like. Aggregator 110 is suitably able to provide control instructions to each component 102-105 and to receive media content from each component 102-105 using whatever communications capabilities may be available. The aggregator 110 may obtain such control instructions available on each component 102-105 through an appropriate application programming interface (API) of the component 102-105 or may obtain such control instructions from an external source, such as a third party server. It is not necessary that all of the media sources 102-105 communicate in the same manner, and aggregator 110 may communicate with different media sources 102-105 using any number of different techniques and protocols.

FIG. 1 also shows a media storage device 106 as a source of media content. A storage device could include a hard disk drive, memory stick, network attached storage device or other physical media capable of storing digital data in magnetic, optical or other format. In an exemplary embodiment, media storage device 106 could be a memory card or disk drive that is accessible using conventional universal serial bus (USB) or similar concepts, including any media access standards that are presently known or subsequently developed. In equivalent embodiments, media storage device 106 may be a cloud drive or other virtual storage device capable of storing digital media that is accessible via network 108 or otherwise. Media content stored on device 106 could variously include user-created photos, music, videos or other content, as well as movies, television programming and/or other content that is downloaded, copied or accessed from any other source.

Media aggregator 110 is able to receive media content from any of the media sources 102-106 and to output the content for presentation on display 120. Display 120 may be a conventional television set or monitor, for example, that is physically and electrically connected to the media aggregator device 110 using component, composite, HDMI, S-Video or any other cabling. Various embodiments may provide security checks to ensure compliance with digital rights management or other licensing requirements, or to otherwise ensure that content presented on the display 120 is legal and approved for display by the content owner.

In some implementations, a television receiver/STB 104 or other media source may provide multiple simultaneous inputs to the aggregator 110 (e.g., multiple virtual or physical connections between the source device and the aggregator 110) such that the aggregator 110 simultaneously receives multiple independent streams from the source device. For example, a television receiver/STB 104 may have multiple outputs (e.g., one or more S-Video, HDMI, composite or component video or other outputs) that can each provide an output corresponding to one of the multiple tuners of the STB, and each of these separate outputs may be separately controlled by the aggregator 130. This feature may have several benefits in various embodiments. First, it could allow multiple programs from a single receiver or other source to be processed at aggregator 110. Additionally (or alternatively), it could allow the aggregator 110 to receive a program or signal via one connection that might not be available via another connection. If HDMI encoding or other access restrictions prohibited output of a program on a particular output of the receiver, for example, the same program might nevertheless be available on a different output port (e.g., an S-Video port or other non-HDMI port). The aggregator 110 may therefore, in various embodiments, request programs on different connections or ports to the same content source if a first request on a first port is not successful.

Media aggregator 110 may also provide audio outputs to display 120, to AVR 103, and/or the like. Various embodiments may be able to support multiple output displays 120, as desired, through the use of multiple display interfaces, as described more fully below.

In at least one embodiment, aggregator 110 receives control instructions from a remote network-enabled device 130 that communicates with the aggregator 110 via network 108. In various embodiments, the remote device 130 is a mobile telephone, tablet, personal computer or other general purpose computing device that executes software to implement network-enabled remote control functions. To that end, remote device 130 may execute a remote control application 132 that accepts user inputs via a touchscreen, keyboard, mouse and/or other conventional input device and that translates those inputs into commands that can be transmitted to aggregator 110 for execution.

Although this document occasionally refers to the network-enabled device 130 as "remotely-located", in practice device 130 may be in the same room as aggregator 110, or otherwise in close physical proximity, at least at certain times. The device 130 is nevertheless "remote" in the sense that it communicates with aggregator 110 via network 108 instead of as a conventional remote control. To provide just one example, a customer may be able to use his or her mobile phone as a controller so that touch inputs, gestures, and the like can be applied on the mobile phone. These inputs can be relayed to the aggregator 110 via network 108, thereby allowing compatibility with hardware that is already in the customer's possession, and that is already familiar to the customer. To that end, an iOS, Android or other application, for example, could allow conventional smartphones to act as network-enabled remote controls for any number of media sources 102-106. Such applications translate user inputs to commands that can be transmitted via network 108 to aggregator device 110, which in turn acts as an intermediary by relaying the commands to the correct devices 102-106 using RF, IR, CEC, TCP/IP or other control mechanisms that may be available.

FIG. 1 shows remote device 130 executing both a control module 132 and a media player module 131 that is capable of playing back placeshifted media streams 142. In practice, the control and media playing functions could be separated between multiple devices 130, as desired. This could allow, for example, a first device 130 (such as a mobile phone) to control a media stream 142 that is placeshifted to a separate computer, network display, television, receiver device and/or the like. In many implementations, however, both control module 132 and media player module 131 may be integrated into a common application that is executable on a mobile phone, tablet, personal computer, web browser, media device, video game player, and/or other computing platform as desired.

In operation, then, the customer configures media aggregator device no by plugging in the various media source components 102-106 as appropriate. The device may use any sort of "plug and play" techniques (e.g., UPnP, HDMI/CEC signaling or the like) to automatically recognize media source components 102-106 in some embodiments, and/or the customer may manually configure the types of components that are connected, as desired. In at least one embodiment, the customer may configure one or more remote devices 130 with control software 132 and/or media player software 131 so that the device 130 is able to interact with the aggregator no via network 108. As described above, in at least one embodiment, the media aggregator 110 may communicate one with or more components 102-105 through an API or other protocol to determine how to communicate control commands to the component 102-105. In another embodiment, the media aggregator 110 may identify a component 102-105 and automatically query an external server to determine and/or obtain a configuration that enables the media aggregator no to communicate with the component 102-105. In some embodiments, this "configuration" may be a set of codes that can be provided by the media aggregator no to produce desired actions by the component 102-105, as desired.

As the customer provides instructions to remote device 130, the control module 132 suitably provides commands 141 to aggregator 110 via network 108. Such commands may be provided using conventional TCP/IP or similar protocols that are already known to the remote device 130; other embodiments may use other protocols, including any sort of proprietary protocols as desired.

Aggregator 130 suitably processes the received commands 141 to control one or more of the media sources 102-106 and thereby access and output desired content output on display 120 and/or media player 131. Content presented on local display 120 may be provided using conventional video signaling 143; content placeshifted to remote device 130 may be encoded and otherwise processed using any number of media streaming techniques and constructs. Examples of general placeshifting techniques are set forth in United States Patent Publication No. 2006/0095471 and in U.S. Pat. No. 6,263,503, and exemplary techniques for establishing placeshifting sessions are described in U.S. Pat. No. 8,171,148, although the features described herein could be equivalently applied with any number of other techniques and structures in addition to those described in these particular references.

The use of a network-controlled aggregator allows a number of useful features. In addition to the flexibility and convenience of controlling multiple A/V components from a single device 130 that is familiar to the user, various embodiments of aggregator 110 allow multiple media functions to occur simultaneously. Although conventional placeshifting devices typically only allowed one output to either a display or to a network session, for example, an aggregator as shown in FIG. 1 could provide an output 143 to a local display 120 that differed from a placeshifted media stream 142 that is transmitted to a remote device 130. A first user watching display 120 could view content stored on a USB drive 105, for example, while a second user simultaneously viewed a placeshifted media stream from a STB or similar television receiver 104, DVR or the like. Alternatively, media content from a network service 140 could be stored on a storage device 105 while the user watched television programming on display 120 and/or remote device 131. While some implementations may limit tasks that can simultaneously occur for licensing or other reasons, other embodiments may allow any number of input streams from source devices 102-106 to be presented on any number of local displays 120 and/or placeshifted to any number of remote displays 130. Even further, some implementations could combine inputs from multiple sources 102-106 to create a hybrid placeshifting stream 142, and/or multiple streams 142 could be sent to a single remote device 130 to thereby allow the remote media player module 131 to combine the various streams 142 as desired. Any number of alternate or additional features could be provided in a wide range of equivalent embodiments.

Figure 2:
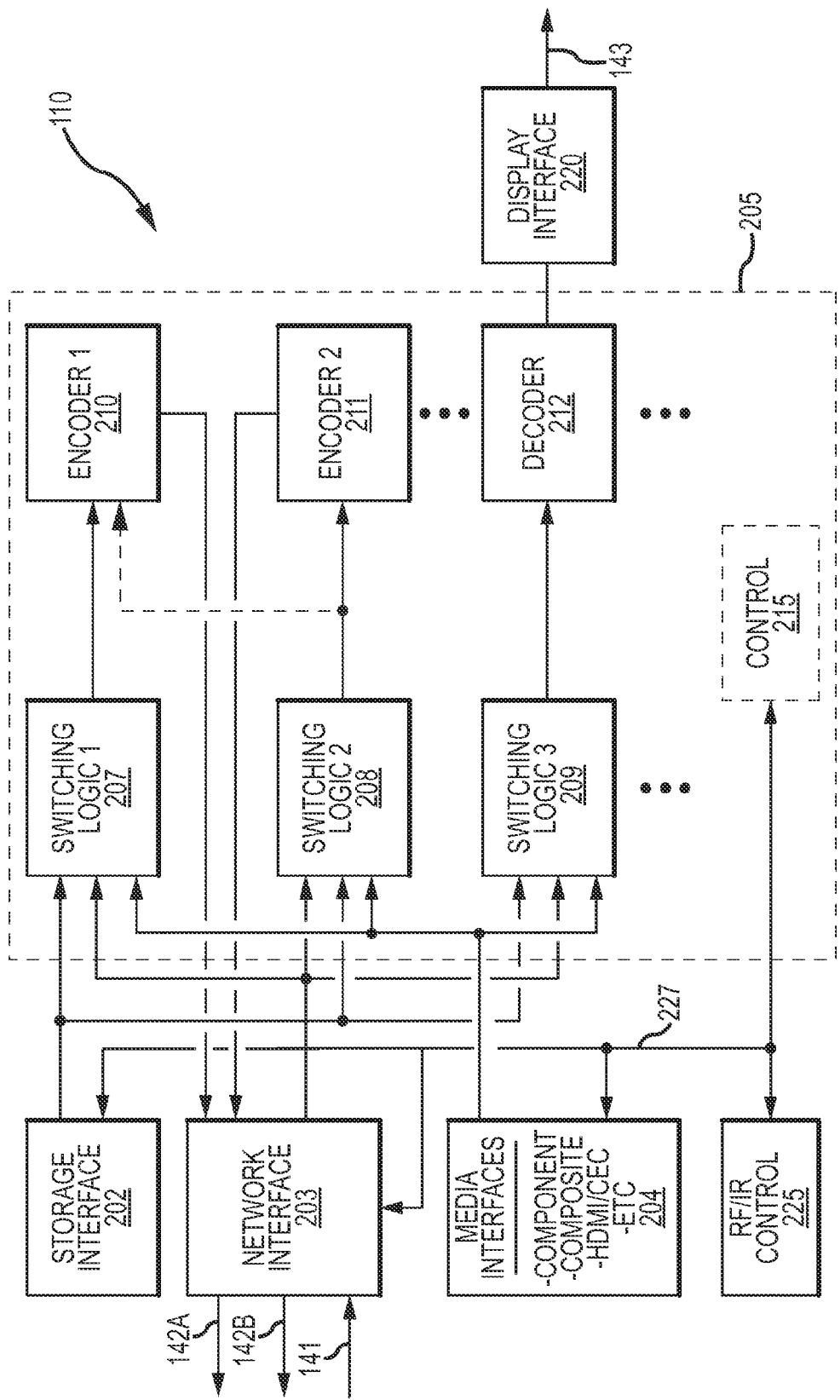
FIG. 2 is a block diagram of an exemplary aggregation device.

FIG. 2 shows a block diagram of an exemplary aggregator device 110 that includes any number of media interfaces 202, 203, 204, a display interface 220, and processing circuitry 205 that performs various switching, controlling and/or signal processing functions as appropriate. The aggregator device 110 shown in FIG. 2 also includes an RF transceiver, IR blaster and/or similar module 225 that can be used to provide commands to media source components 102-105 as desired.

Storage interface 202 includes any appropriate hardware, software, firmware, control logic or the like to facilitate communications with an external media storage device 106. In various embodiments, storage interface 202 is a universal serial bus (USB) or the like that facilitates physical and electrical communication with a memory card, disk drive, mobile phone or other device that is physically coupled to the aggregator 110 using an appropriate cable.

Network interface 203 includes any appropriate hardware, software, firmware, control logic and/or the like to facilitate communications with a local area or other network, such as network 108. In various embodiments, network interface 203 is a conventional Ethernet (IEEE 802.3) interface that allows a physical connection to a local area network operating within the customer's home. Equivalent embodiments may implement network interface 203 using a wireless interface such as a Wifi (IEEE 802.11) interface or the like.

Media interfaces 204 include any appropriate hardware, software, firmware, control logic and/or the like to receive media content from any number of media sources 102-105. Different embodiments may include any number of interfaces 204, as well as interfaces 204 of varying types to support a wide range of media sources 102-105. An exemplary embodiment may include one or more component video, composite audio/video, s-video, HDMI or other interfaces, or any combinations of interfaces as desired.

Display interface 220 similarly provides appropriate hardware, software, firmware, control logic and/or the like to facilitate video output 143 to display 120. Display interface 220 may provide output 143 using component, composite, s-video, HDMI, and/or any other formats, as desired.

Control circuitry 205 suitably includes any sort of microprocessor, microcontroller, digital signal processor or other processing hardware capable of controlling each of the interfaces 202-204 in response to received instructions 141 to thereby produce suitable outputs 142 and 143, as desired. Various processing chips available from VIXS Systems, NXP Semiconductor N.V., Broadcom Corporation, Conexant Corporation and/or others, for example, could be used to provide switching, encoding, decoding and/or the like. In many embodiments, additional chips or other circuitry may be provided to support additional encoding, decoding, switching and/or other functions, as desired.

Circuitry 205 as shown in FIG. 2 performs appropriate switching functions to route video signals as needed from the various input interfaces 202-204. Control circuitry 205 as illustrated in FIG. 2 includes a switch fabric made up of three switching modules 207, 208, 209; these switches may be implemented using physical connections from each interface 202-204 to separate video switching circuitry as appropriate. Alternate embodiments, however, may implement the switching function using virtual switching implemented within a system-on-chip (SoC) or similar integrated circuitry. The various connecting lines shown in FIG. 2, then, should be regarded as logical connections that are not necessarily physically present in an actual device. Alternate embodiments could physically couple the input interfaces to processing circuitry 205 using any sort of bus, direct connection, indirect connection and/or the like.

Further, different embodiments could include any number of switching paths to support any number of different outputs 142 and 143. The embodiment shown in FIG. 2, for example, has three switching modules 207, 208 and 209 to facilitate two placeshifting outputs 142A-B and a single display output 143. Other implementations could provide additional or fewer outputs 142, 143 as desired.

Circuitry 205 includes any number of encoding modules 210, 211 and/or decoding modules 212 as desired. In practice, encoding and/or decoding functions may be provided by a SoC or similar integrated chip, or by separate components as desired. Encoding 210, 211 may involve converting a video signal (such as analog-to-digital conversion or transcoding) received from an interface 202-204 to a video streaming format that can be placeshifted to a remote device 130, as described above. Placeshift encoding may be performed in accordance with any proprietary or other media format to produce any number of placeshifted media streams 142A-B.

Various embodiments may also support a decoder function 212 as desired. Decoding may be used, for example, to decode files stored on a storage device 106 or received directly from a service on network 108. Decoding may also be performed on video received from other sources 102-106, as desired. FIG. 2 shows decoded video as being provided to the display interface 220 for presentation on the local display 120. Further embodiments may allow decoded video signals to be subsequently encoded for placeshifting, as desired.

Control circuitry 205 also includes a control module 215 that receives control signals 141 via network interface 203 and that processes the signals 141 to direct the operation of media sources 102-106 and to generate appropriate output signals 142, 143 as desired. Control module 215 communicates with the various interfaces 202-204 and with the command module 225 via a suitable control bus 227 and/or other signal path(s) as desired. Control module 215 may also process on screen displays (OSD) generated within output streams 142 and 143, and may perform other tasks as well.

In operation, control module 215 suitably receives commands 141 from the remote device 130 via network interface 203. The control module 215 selects the appropriate source device 102-106 to obtain desired content for the viewer and controls the selected device 102-106 as appropriate using whatever control mechanisms are available. Various component sources 102-106 may be controlled using command module 215, HDMI/CEC signals from interface 204, network packets transmitted via network interface 203, and/or the like. The video signals received on the appropriate interface 202-204 are then encoded and/or decoded as needed so that the content can be provided for placeshifting 142 and/or for presentation on local display 130. In this embodiment, the user provides instructions In the exemplary embodiment shown in FIG. 2, multiple placeshifted streams 142A-B are supported. These two streams could be combined at the encoder 210 so that imagery from two different sources 102-106 is provided within a single stream to a remote device 130. This could allow, for example, a picture-in-picture feature to be implemented on a remote device even though only one placeshifted output 142 is available. Other embodiments could provide two separate placeshifting streams 142A and 142B, thereby allowing separate streams to be provided to multiple devices 120, or for a single device 120 to receive multiple streams 142A-B. In this latter case, the multiple streams could then be processed at the remote device 130, as desired, to support PIP functions, multi-screen views, and/or the like, as described more fully below.

Figure 3:
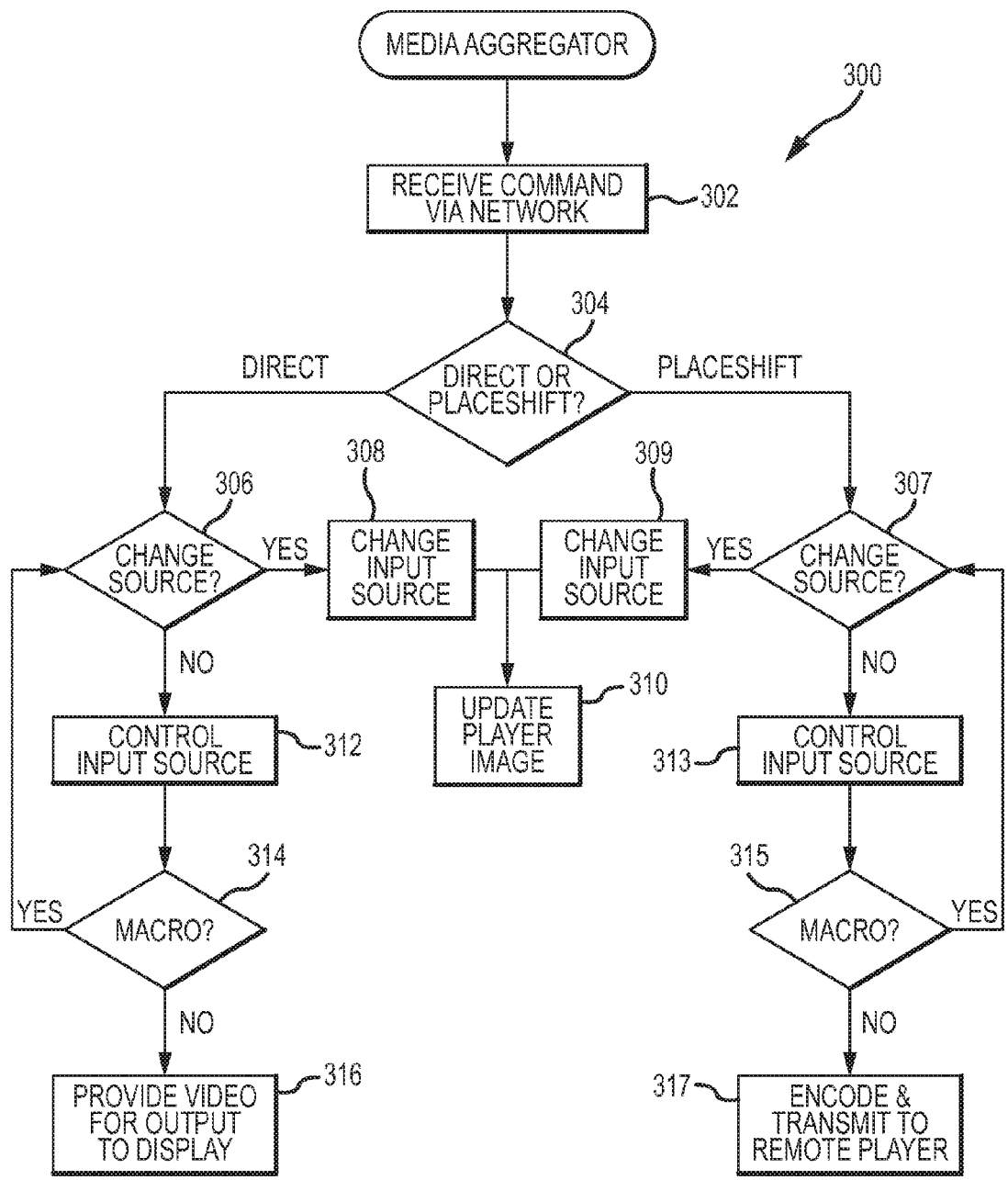
FIG. 3 is a flowchart of an exemplary process executable by an exemplary aggregation device operating within a home entertainment system.

FIG. 3 shows an exemplary process 300 for operating a media aggregator 110 as described above. FIG. 3 demonstrates the presentation of video output 143 to a local display (function 316) while simultaneously placeshifting a video stream 142 to a remote device 130 (function 318). Generally speaking, process 300 suitably includes the broad functions of receiving a command 142 via network 108 and responding to the command 142 to select a media source 102-106 (functions 306, 307, 308, 309), to control the selected media source 102-106 (functions 312, 313), and to provide the desired outputs to the local display 120 and to the remote device 130 (functions 316, 317) as appropriate. Other embodiments may include alternate or additional functions, or functions arranged in a different order, as desired.

As noted above, user instructions are typically provided to a mobile phone, tablet, personal computer or other remote device 130 using conventional touchscreen, mouse, keyboard or other inputs. Control software 132 executing on the remote device 130 suitably translates the received inputs into instructions 141 that are routable on network 108 and that can be understood by aggregator 110. Commands could include, without restriction, any instructions to select or control any of the different media devices 102-106 that are in communication with the aggregator 110, as well as any instructions to control local display 120, aggregator device 110 itself, or any other device. In various embodiments, the control software 132 provides a graphical image of an actual, physical remote control that is typically associated with the controlled device. As the user activates buttons, sliders or other features on the graphical remote control, instructions corresponding to the instructions that would ordinarily be provided by an IR, RF or other remote are generated by the client software and provided to the aggregator 110 via network 108. As described below, the particular imagery displayed to the user may be changed during operation to reflect the particular component 102-106 being controlled.

Instructions 141 received from the remote device 130 may adjust either the placeshifted media stream 142, the output 143 to the local display, and/or both streams 142, 143 as desired (function 304). In various embodiments, the control software 132 provides different modes of operation for controlling local and placeshifted streams, so the context of the instruction 141 may be apparent when the instruction is received and the device is operating in a known mode. Other embodiments may embed identification data within the command itself that allows the command to be identified as a "placeshifting" command or a command intended for the local display stream 143.

If the instruction 141 is intended to change the media source 102-106 that provides the media stream 142, 143 (functions 306, 307 respectively), then the control module 215 of aggregator 110 suitably selects and obtains the appropriate media content from the selected device 102-106 (functions 308, 309). As noted above, control module 215 provides appropriate control signals to the interfaces 202-204 and/or to the command module 225 to direct the selected device to provide requested content to the aggregator 110. In various embodiments, changing the input source may change the imagery presented in the remote control module 132 of remote device 130 (function 310). If the user instructs that the source be switched from a television receiver 104 to a streaming device 102, for example, an image of the television receiver remote may be changed to an image of the remote typically associated with the streaming device so that the user can continue to provide relevant inputs to the device under control. Function 310 may be implemented entirely within remote device 130 without further input from aggregator 110 in some embodiments. That is, the remote device 130 may itself determine that the imagery should change from the current control context and the command issued by the user. If a user selects a change to obtain content from a media player 105 instead of a DVR 106, for example, the remote could note this change and responsively change the presented imagery from an interface associated with the DVR 106 to an interface associated with the media player 105 without further instruction from the aggregator 110. Additional detail about a multi-image remote feature is provided below with respect to FIG. 4

The aggregator 110 controls the selected video source as needed to obtain desired content, or to perform any other tasks (functions 312, 313). Instructions are provided from the aggregator to the controlled device 102-106 using RF, IR, TCP/IP, HDMI/CEC or other control mechanisms as appropriate for the particular device being controlled.

In some embodiments, macro commands (functions 314, 315) may be provided. Macros could allow a single user instruction received at remote device 130 to generate multiple commands issued to one or more devices under control by aggregator 110. As an example, remote control module 132 could allow an option to "Show Recorded Programs" that would select the DVR or STB 104 as a media source and then issue appropriate commands to the selected source to generate a video screen that shows the recorded programming. Similar macros could be formulated that involve issuing commands to multiple devices. A "play movie" command issued for the local display stream 143, for example, might bring up a listing of movies available on one or more media sources 102-106 while also configuring the AVR 103 to enter a surround sound or other enhanced audio mode. Such commands may be stored as a script or other macro at the aggregator 110 as desired for subsequent retrieval and execution. Macros may be "recorded" by keeping a record of a series of user actions, or the necessary actions to execute certain functions could be obtained from a remote server, from software or firmware stored at the aggregator 110, and/or other source. The various commands sent to the different devices 102-106 could be issued in series or parallel, as appropriate, using any of the different command channels that are available to the aggregator 110.

Generally speaking, the various functions and features of process 300 may be automatically executed by any sort of hardware, software and/or firmware logic that is stored and/or executed on any platform. Some or all of process functions may be carried out, for example, by programmed logic executing within aggregator device 110 and/or playback device 130 in FIG. 1, as appropriate. In one embodiment, control module 215 (FIG. 2) executes software logic that performs each of the various functions associated with aggregator 110. Such logic may be stored in memory or in any other non-transitory storage available to control module 215 as desired. Media player device 130 may similarly have a processor to execute software instructions that carry out the various functions shown to be associated with device 130. Such instructions may be stored in a memory or other non-transitory storage medium available to the media player 130 as desired. The particular logic and hardware that implements any of the various functions shown in FIG. 3 may vary from context to context, implementation to implementation, and embodiment to embodiment in accordance with the various features, scenarios and structures set forth herein. The particular means used to implement each of the various functions shown in FIG. 3, then, could be any sort of hardware processing structures that are capable of executing conventional software logic in any format. Such processing hardware may include control module 215 or other components of aggregator 110, as well as any other processors or other components associated with playback devices 130 as appropriate.

Figure 4:
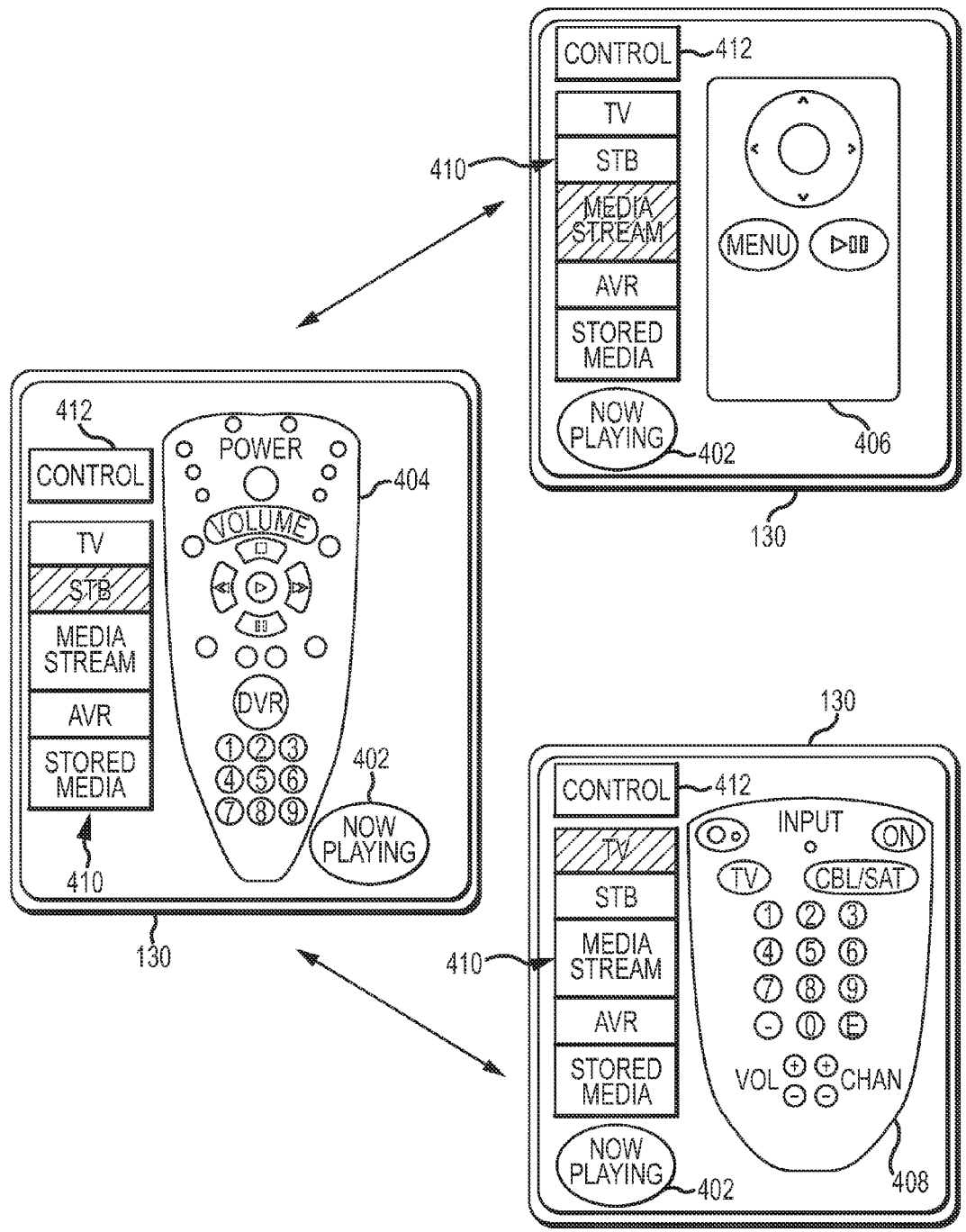
FIG. 4 is a diagram showing a network-enabled control device that is capable of displaying multiple skins for controlling different components of a home entertainment system.

FIG. 4 shows several exemplary user interfaces that could be displayed on remote device 130. The various views shown in FIG. 4 illustrate that different images of the various remote controls typically associated with components 102-106 and/or display 120 could be graphically presented on the remote device 130 to allow the user to apply commands to the particular device. Image 404, for example, illustrates an exemplary remote that could be associated with a television receiver/STB 104 so that the user is able to fully control the STB 104 as desired. If the user instead wishes to control a media streaming device 102, a different image 406 associated with the device 102 could be presented at that time. Further, if the user wanted to make changes to the local display, a third image 408 associated with the television remote could be presented. The various images associated with different remotes could be stored in any format (e.g., JPG, PNG or the like) on the remote device 130, with active regions for accepting inputs identified within the image as appropriate.

The exemplary interfaces shown in FIG. 4 allow the user to switch between the different remote images by selecting from a menu bar 410 that includes options for each of the available remote images. As the user wishes to control different components of the home entertainment system, then, he or she simply indicates which component is to be controlled from list 410, and the remote control module 135 appropriately obtains the image associated with the selected component. Images of the relevant remotes are obtained and stored at the remote device 130 in any manner. For example, the various available remote images may be selected from a database of available images. The database may be accessed via network 108, for example, and images (and associated command information) may be downloaded to control device 130 as needed. Other embodiments may provide remote control images and associated data for any number of different components as part of control application 132 or the like.

FIG. 4 also shows a "Now Playing" button 402 that is present in each of the various screens. This button 402 may also be presented during views of program guides, configuration screens, and/or the like. When the user activates the "Now Playing" button 402, the controlled display is suitably cleared to allow the last-viewed media content to continue. If the user is controlling a placeshifted media stream 142, for example, any configuration or control data that overlies the media presentation or that takes the place of the media presentation on the display of remote device 130 is appropriately removed. Similarly, if the user is controlling a video stream 143 for the local display 120, any guide data, configuration data or other on-screen displays that overly or replace the media presentation can be removed, and presentation of the last-viewed media (or the media last viewed in full-screen mode) continues on the display. This feature can be useful if, for example, the user wishes to quickly exit from a configuration menu or the like and resume viewing of the media presentation. The feature is also useful if the user makes a mistake or otherwise becomes confused with the control interface, since it provides a convenient opportunity to "start again" with whatever tasks the user intended. The state of the current video stream 142 and/or 143 (e.g., the source 102-106, program name, channel tuned, etc.) may be maintained within control module 132, control module 215, or anywhere else within aggregator 114 and/or remote device 130 to facilitate rapid restoration to the last viewed imagery. Various embodiments may also maintain a time stamp or similar marker that allows the particular point of the program to be readily resumed in response to user instruction. Other embodiments of the "now playing" feature 402 may simply clear any generate on-screen displays or other interface features that are overlying ongoing presentation of the media stream 142, 143, as desired.

The "Now Playing" button in FIG. 4 may be supplemented or substituted with a "Last Playing" button or the like that allows a user to access content they were previously watching. As the user switches content or content sources, the aggregator 130 may be configured to track one or more previously viewed content instances (such as source, channel, timestamp and the like), allowing the user to quickly jump back to previously viewed content. For example, a user may be watching a movie stored on storage medium 106 and may utilize menu bar 410 and to switch to the input of aggregator to a satellite receiver. The user may further use image 404 to switch to a channel featuring a football game. The aggregator 130 may track the previous input and content location, such that pressing a "Last Played Button" enables a macro that switches the input back to the storage medium 106 and resumes playing of the movie at the timestamp when the user switched to the football game. To implement a "Last Playing" feature, the aggregator 110 may simply maintain the stored information about the current video stream 142 and/or 143 (e.g., the source 102-106, program name, channel tuned, etc.) after the user switches to a different program or source, thereby allowing rapid restoration to the previously-stored status. Note that such settings may include time stamp or similar data, thereby allowing quick reversion to the same point in a program where viewing was previously left off, as desired.

The exemplary interfaces shown in FIG. 4 may be supplemented or modified in any manner. Various embodiments could provide features for accessing electronic program guides, web sites and/or any other features provided by aggregator 110 or other services as desired.

The discussion above addresses the ability to simultaneously process video inputs from multiple sources 102-106 to produce multiple output streams 142, 143 that can be placeshifted to a remote device 130 and/or output for presentation on a locally-connected display 120. Various embodiments may further enhance the integration of media content from multiple sources by providing multiple placeshifting streams (e.g., streams 142A-B in FIG. 2) to a common remote device 130. The multiple streams could facilitate, for example, a picture-in-picture (PIP) feature, a split-screen viewing experience, or any other features as desired.

One technique for combining video imagery from multiple sources was discussed above with reference to FIG. 2. In that example, media content obtained from two different sources 102-106 can be blended at the aggregator 110 prior to encoding of a single placeshifted media stream 142 that is routed on network 108 to the remote device 130.

In another example, two separate streams 142A and 142B can be separately received, encoded and transmitted to the remote device. This could facilitate different qualities of encoding (e.g., a higher resolution, bit rate and/or frame rate for a primary stream and a lower quality for a secondary stream), or enhanced control of either stream independent of the other stream. The two placeshifted streams 142A-B are then combined, as desired, at the media player 131 application executing on the remote device 130.

Figure 5:
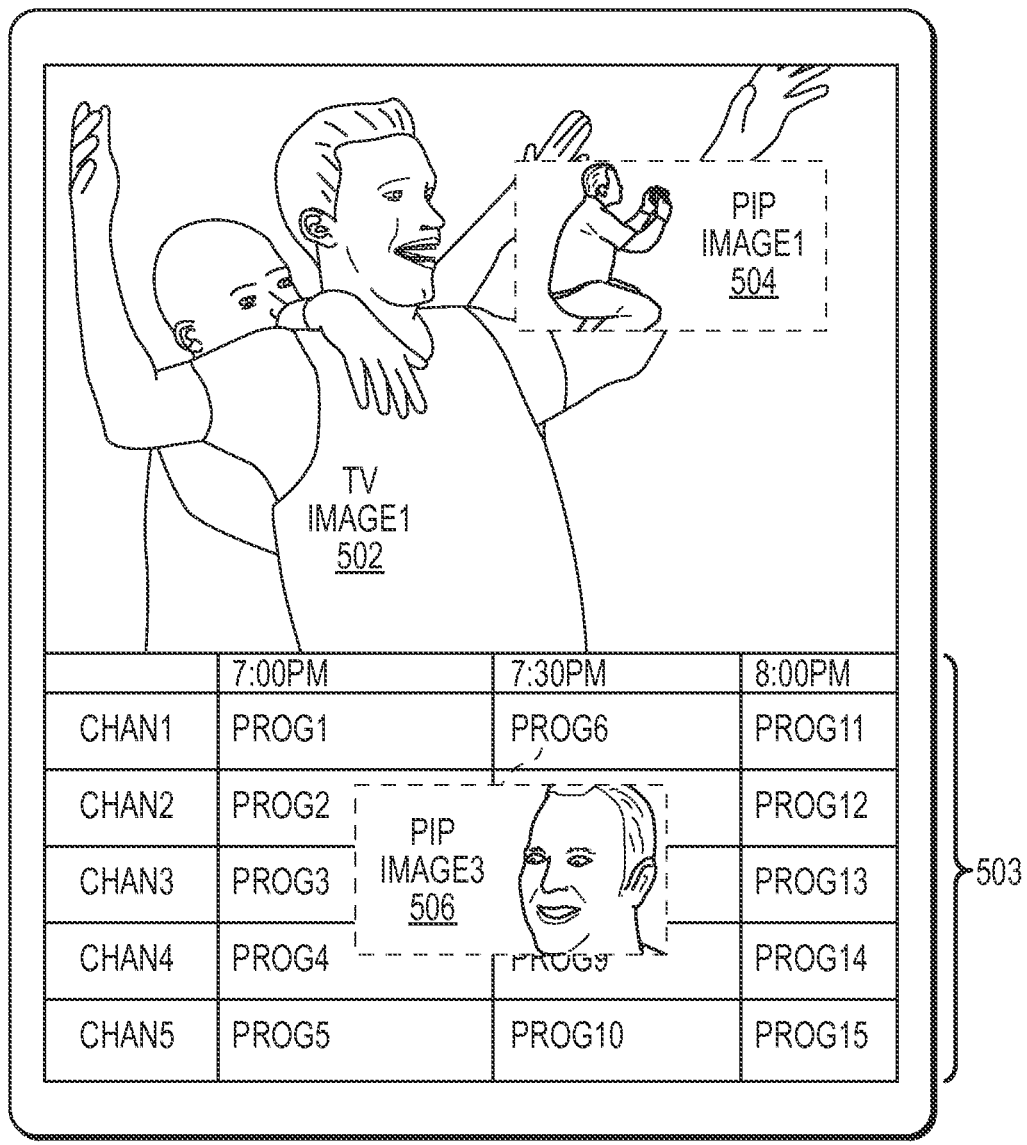
FIG. 5 is a diagram showing several options for processing picture-in-picture imagery or other content from multiple placeshifting streams.

FIG. 5 shows two examples in which multiple streams may be beneficial. In the example shown in FIG. 5, a program image 502 is presented in the top of the display and a program guide 503 is presented in the bottom of the display. The program imagery 502 may be received as the primary placeshifted stream 142A. Secondary imagery from a second placeshifted stream 142B could be used to implement a picture-in-picture window 504 that overlies the presentation 502 of the primary content, and/or a PIP window 506 could overly the program guide 503 shown in the bottom of the display. The content of the secondary stream 142B can be controlled independently from the primary stream, thereby allowing PIP "channel surfing" in window 504 or window 506 without disrupting the primary stream 502. This feature may be useful in providing a guide browsing feature or the like in which the PIP window 504 or 506 is updated to show content selected by the user within program guide 503. If the viewer is watching a recorded program in the primary stream 142A, for example, the secondary stream could represent content obtained from a tuner or other receiver so that the user could browse available content in guide 503 without disrupting the primary display 502.

Secondary streams 142B may also be useful to facilitate rapid channel switching or other "fast start" applications. In such cases, it may be desirable to encode the secondary stream 142B at a lower quality than stream 142A to preserve network bandwidth, as desired. Multiple streams could be obtained at aggregator 110 from one or more source devices. As noted previously, some embodiments might obtain multiple simultaneous input streams from the same source device 104. These streams could be placeshifted to one or more remote devices 130, either as separate streams or as a blended stream provided from an encode 210 or the like. Other benefits and features may be available in any number of other embodiments.

It is not necessary that both placeshifted streams 142A-B produced by an aggregator device 110 be provided to the same remote device 130, nor is it required that both streams received by the remote device 130 be provided from the same aggregator 110. In various embodiments, one of the streams 142A or 142B displayed on remote device 130 is received from a separate source (e.g., a video streaming server) on network 108, or the like. Still other embodiments could obtain a media stream via a tuner or other receiver onboard the remote device 130, or from any other source, such as a video-on-demand service, file or media server, and/or other remote source on network 108.

In at least one embodiment, the aggregator 110 may be configured to receive content from the remote device 130 and to store the content to the storage media 106 or other storage. Aggregator 106 could additionally or alternately output the content to the display 120 and/or placeshift the content to another remote device 130, as desired. In one example, a remote device 130 provides videos or photos (e.g., photos or videos taken with a mobile phone) that are downloaded by the media aggregator 110 and made available for viewing through the media aggregator 110 on any other connected device. In another embodiment, the media aggregator 110 receives content from the remote device 130 and outputs the content to the display device 120 for immediate viewing, thereby providing placeshifting of the content available on the remote device 130. The content output by the media aggregator 110 to the display 120 in this example may be supplemented with other content from any component 102-106, with on screen displays generated by the media aggregator 110, and/or by user input through the remote device 130 or other input devices associated with the media aggregator 110. The media aggregator 110 may be also configured to placeshift content received from a remote device 130 to another remote device 130 in a similar manner, with the placeshifted content remaining substantially unmodified and/or being supplemented with other content as desired.

In various embodiments, these features allow the media aggregator 110 to act as a personal cloud or similar remote storage facility that synchs stored content from any number of remote devices 130 and that makes such content available to other devices at a later time. For example, the media aggregator 110 may be configured to automatically sync with a connected remote device 130 when the remote device 130 is present on the same local area network (LAN) and download selected types of content (e.g., audio, video or image content) or may sync content as requested by a user. This downloading would place all of the user's content in one convenient place, such that a video captured on a mobile phone can subsequently be seamlessly viewed on the user's tablet computer or family member's phone. Other examples could obtain content, store content and/or distribute content in any other manner.

Figure 6:
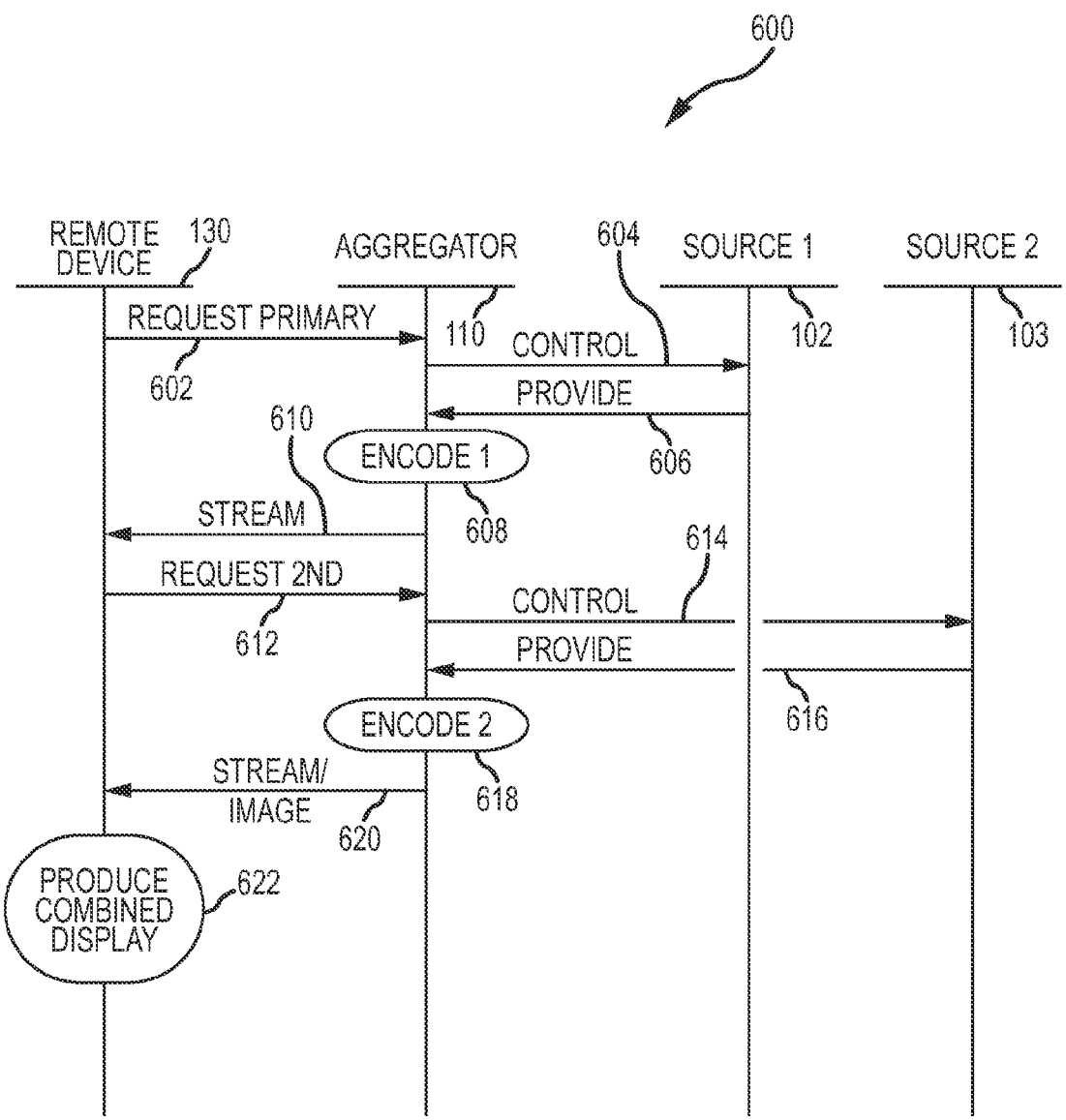
FIG. 6 is a process flow diagram showing an exemplary process for obtaining multiple placeshifted media streams from different sources.

FIG. 6 shows an exemplary process 600 for implementing multiple placeshifted streams within an aggregator device 110. As shown in FIG. 6, the remote device 130 suitably requests the primary media stream 142A from the aggregator 110 (function 602). The aggregator 110 controls the media source 102-106 that has the requested content (function 604) by providing IR, RF, TCP/IP, HDMI/CEC or other commands to the controlled device (which is device 102 in this example, although alternate embodiments may use other media sources 102-106 or the like). The controlled media source suitably provides the requested media content to the aggregator 110 (function 606), which encodes the primary stream 142A (function 608) and transmits the primary stream 142A to the remote device 130 (function 610) for playback.

The remote device 120 similarly provides additional commands 141 (function 612) that result in the selection and control 614 of a second source (source 103 in this example, although others could be equivalently used) to obtain the second placeshifting stream. The controlled second source suitably provides the media content (function 616) to the aggregator 110, which encodes the received content into a format that can be placeshifted as secondary stream 142B (function 608). The secondary stream 142B is then transmitted to the remote device 130 via network 108 (function 620).

The two streams 142A and 142B may be combined and presented to the user in any manner (function 622). As described above, the secondary stream 142B may be used to provide a PIP feature, a side-by-side viewing experience, and/or the like. While the secondary stream is described herein as providing motion video, equivalent embodiments could simply provide still images (e.g., an image extracted from a nearby I-frame) to reduce encoding and transmission overhead. Other embodiments may be supplemented or modified in any manner.

The various systems, devices and processes described above may provide any number of advantages and benefits. To provide just one example, some implementations may be able to use the media aggregator 110 as an "IP to IR" converter wherein the customer's mobile phone, tablet, web browser or other familiar device becomes a very effective remote control for the customer's entire home entertainment system. The aggregator 110 is able to flexibly communicate with any number of different devices using RF, IR, HDMI/CEC, TCP/IP or other control techniques to produce desired output streams 142, 143 on one or more local or remote displays. Further, different image "skins" can very accurately represent the different remote controls generally associated with the variety of devices making up the customer's home entertainment system. This provides an interface that allows familiarity both in terms of the features available and in terms of the hardware used by the customer, without the supplier having to supply additional remotes or other control hardware at all. Moreover, multiple streams from different sources can be simultaneously obtained, processed and routed to any number of different displays, thereby greatly improving the functionality and flexibility of the user experience.

The general systems, structures and techniques described above may be inter-combined, enhanced, modified and/or otherwise implemented to provide any number of different features. To that end, the term "exemplary" is used herein to represent one example, instance or illustration that may have any number of alternates. Any implementation described herein as "exemplary" should not necessarily be construed as preferred or advantageous over other implementations. While several exemplary embodiments have been presented in the foregoing detailed description, it should be appreciated that a vast number of alternate but equivalent variations exist, and the examples presented herein are not intended to limit the scope, applicability, or configuration of the invention in any way. To the contrary, various changes may be made in the function and arrangement of the various features described herein without departing from the scope of the claims and their legal equivalents.

What is claimed is:

1. A media aggregation system to provide media content received from any of a plurality of media sources, the system comprising:
a network interface configured to couple to and facilitate communication with a digital network;
a display interface configured to provide a video output to a locally-connected display;
a plurality of media interfaces, each media interface configured to couple the media aggregation system to receive media content from one of the plurality of media sources;
a controller configured to respond to instructions received from a remote device via the digital network;
a first encoder and a second encoder each configured to encode a first and a second placeshifted video stream, respectively;
a video decoder configured to decode the media content from the first one of the plurality of media sources to produce the video output to the locally-connected display; and
a plurality of video switches controlled by the controller and coupling each of the plurality of media interfaces to the first encoder, to the second encoder and to the video decoder to thereby allow the controller to switchably provide media content from any of the plurality of media sources to any of the first encoder, the second encoder or the video decoder in response to the instructions to thereby simultaneously provide a first and a second placeshifted video streams to the remote device via the digital network while the system is simultaneously providing video output incorporating media content from a first one of the plurality of media sources to the locally-connected display, wherein the video output incorporates the media content received from a first one of the plurality of media sources, the first placeshifted video stream incorporates media content received from a second one of the plurality of media sources, and the second placeshifted video stream incorporates media content received from a third of the plurality of media sources.

2. The media aggregation system of claim 1 wherein the remote device is operable to combine the first and second placeshifted media streams received from the media aggregation system to produce a hybrid display that incorporates moving video imagery from each of the first and second placeshifted media streams.

3. The media aggregation system of claim 2 wherein the first placeshifted stream is a primary stream representing a media program for playback, and wherein the second placeshifted streams represents content currently broadcast on channels shown in an electronic program guide.

4. The media aggregation system of claim 1 wherein the plurality of switches are further configured to provide multiple media content streams from different media sources to the first and second encoders, and wherein the first and second encoders are each configured to produce the first and second placeshifted video streams as streams that include video imagery from each of the multiple content streams.

5. The media aggregation system of claim 1 wherein the controller is configured to maintain state data about the output so that when a user interface feature on the remote device is activated, the media aggregation system returns the controlled display to a full-screen mode in which the last-viewed media stream is restored for continued viewing.

6. The media aggregation system of claim 1 wherein at least one of the media sources is coupled to multiple ones of the plurality of media interfaces for providing multiple simultaneous streams incorporating media content from the same media source.

7. The media aggregation system of claim 1 further comprising a digital storage, and wherein the controller is further configured to obtain media content from the remote device for storage and subsequent playback by the media aggregation system.

8. The media aggregation system of claim 1 wherein the remote device is configured to present an image of a remote control device associated with the media source being controlled by the media aggregation system, and to change the image of the remote control to a different image of a different remote control device when the media source being controlled is changed.

9. A method executable by a media aggregation system comprising a first video encoder, a second video encoder, at least one video decoder and a plurality of video switches configured to switchably couple any of the first, second and third media sources to the first video encoder, the second video encoder and the at least one video decoder, the method comprising:
receiving media content from a first media source, a second media source and a third media source by the media aggregation system;
receiving control instructions from a remote device at the media aggregation system via a digital network;
controlling the plurality of video switches of the media aggregation system in response to the received control instructions to thereby simultaneously provide the media content from the first media source to the first encoder to create a first placeshifted video stream, the media content from the second media source to the second encoder to create a second placeshifted media stream, and the media content from the third media source to the video decoder to create decoded media content;
providing the decoded media content from the third media source to a display interface of the media aggregation system for output to a locally-connected display; and
while providing the decoded media content, the media aggregation system simultaneously transmitting the first and second placeshifted media streams to the remote device via the digital network.

10. The method of claim 9 further comprising determining whether the control instructions relate to the media output to the locally-connected display or to the placeshifted media stream.

11. The method of claim 9 wherein the remote device combines video from both the first and the second placeshifted media streams into a single display for playback by the remote device.

12. The method of claim 9 wherein the controlling further comprises switching the media content from a fourth one of the plurality of media sources to the encoder so that the placeshifted media stream encodes moving video from both the third and the fourth media sources.

* * * * *